US011199624B2

(12) United States Patent
Napolitano et al.

(10) Patent No.: US 11,199,624 B2
(45) Date of Patent: Dec. 14, 2021

(54) BATHYMETRIC SYSTEM AND BATHYMETRY METHOD CORRECTED FOR ALTITUDE ERRORS

(71) Applicant: IXBLUE, Saint-Germain-en-Laye (FR)

(72) Inventors: Fabien Napolitano, Mareil-marly (FR); Didier Charlot, Le Relecq-kurhuon (FR)

(73) Assignee: IXBLUE, Saint-Germain-en-Laye (FR)

( * ) Notice: Subject to any disclaimer, the term of this patent is extended or adjusted under 35 U.S.C. 154(b) by 757 days.

(21) Appl. No.: 15/774,970

(22) PCT Filed: Nov. 9, 2016

(86) PCT No.: PCT/FR2016/052917
§ 371 (c)(1),
(2) Date: May 9, 2018

(87) PCT Pub. No.: WO2017/081416
PCT Pub. Date: May 18, 2017

(65) Prior Publication Data
US 2020/0264290 A1     Aug. 20, 2020

(30) Foreign Application Priority Data

Nov. 13, 2015   (FR) ...................................... 1560887

(51) Int. Cl.
*G01S 15/89*     (2006.01)
*G01S 7/481*     (2006.01)
(Continued)

(52) U.S. Cl.
CPC ........ *G01S 15/8902* (2013.01); *G01S 7/4817* (2013.01); *G01S 7/497* (2013.01);
(Continued)

(58) Field of Classification Search
CPC ............................. G01S 15/8902; G01S 15/89
See application file for complete search history.

(56) References Cited

U.S. PATENT DOCUMENTS 4,207,620 A  *  6/1980  Morgera ............. G01S 15/8902
                                                342/383
4,611,313 A     9/1986  Ziese
(Continued)

FOREIGN PATENT DOCUMENTS

EP      0 140 258 A1    5/1985
WO      01/42812 A1     6/2001

OTHER PUBLICATIONS

International Search Report, dated Feb. 15, 2017, from corresponding PCT/FR2016/052917 application.

*Primary Examiner* — Ian J Lobo
(74) *Attorney, Agent, or Firm* — Nixon & Vanderhye (57) ABSTRACT

Disclosed is a bathymetric system including a multi-beam emitting and receiving device attached to a carrier vehicle, configured, in a first recurrence, to measure the amplitude of a first plurality of beams reflected off the seabed, and a computer to determine three-dimensional spatial coordinates of a first scan swath. In a second recurrence, the device emits a second incident beam and measures the amplitude of a second plurality of beams reflected off the seabed, the computer determines the three-dimensional spatial coordinates of a second scan swath, so that at least one probe point of the first scan swath is redundant with a probe point of the second scan swath, and the computer calculates an altitude variation of the carrier vehicle using altitude variations of the at least one redundant probe point between the first recurrence and the second recurrence.

20 Claims, 2 Drawing Sheets

(51) Int. Cl.
    *G01S 7/497*         (2006.01)
    *G01S 17/89*         (2020.01)
    *G01S 19/42*         (2010.01)

(52) U.S. Cl.
    CPC ............... *G01S 15/89* (2013.01); *G01S 17/89* (2013.01); *G01S 19/42* (2013.01)

(56) References Cited

U.S. PATENT DOCUMENTS

| | | | |
|---|---|---|---|
| 4,924,448 A | 5/1990 | Gaer | |
| RE45,379 E * | 2/2015 | Rowe | G01S 15/87 367/88 |
| 2008/0130413 A1* | 6/2008 | Bachelor | G01S 15/89 367/103 |
| 2010/0157736 A1* | 6/2010 | Riordan | G01S 15/87 367/88 |
| 2013/0016584 A1 | 1/2013 | Zhou et al. | |

* cited by examiner

BATHYMETRIC SYSTEM AND BATHYMETRY METHOD CORRECTED FOR ALTITUDE ERRORS

TECHNICAL FIELD TO WHICH THE INVENTION RELATES

The present invention generally relates to the field of systems and methods for locating the sea bottom based on the reflection of acoustic or light waves.

More particularly, it relates to a bathymetric system or system for measuring the sea bottom depth having a great accuracy of measurement.

TECHNOLOGICAL BACK-GROUND

A great part of the activity of the hydrographic services of different countries consists in determining the sea bottom topography thanks to measurements of depth and relief of these bottoms. This type of measurement, called bathymetric measurements, is also performed by many enterprises working in the fields of marine construction.

Different systems exist, making it possible to perform bathymetric measurements based on the propagation and the reflection of acoustic waves—the sonars—or of optical waves—the lidars. A sonar or a lidar may be towed by a boat or fixed to the hull of a carrier vehicle, for example a boat or a submarine.

Sonar systems using acoustic wave reflection are commonly used to obtain bathymetric measurements and to determine the distance between the sea bottom and the sonar carrier vehicle. In particular, so-called multi-beam sonar systems are known. A multi-beam sonar includes at least one acoustic emitter and several acoustic receivers, and operates on an acoustic recurrence basis, where each acoustic recurrence consists in the emission of an incident acoustic signal towards a sea bottom, followed by the reception of several signals reflected off the sea bottom on the different acoustic sensors. A conventional multi-beam sonar hence provides, in each acoustic recurrence, the measurement of the sea bottom depth in several directions (corresponding to the n reflected acoustic beams detected) forming a scan swath, generally perpendicular to the axis of the carrier vehicle. The combination of several acoustic recurrences of a multi-beam sonar makes it possible to determine the bathymetry of the sea bottoms in a lane along the route of the carrier vehicle.

When conditions allow, and in particular when the sea bottom is shallow (less than about ten metres), a LIDAR system, based on the reflection of a laser beam, may also be used to obtain bathymetric measurements and to determine the distance between the sea bottom and the vehicle carrying this LIDAR system. In particular, laser beam scanning LIDAR systems are known, which make it possible, in each laser recurrence, to measure the sea bottom depth in n directions (n laser beam reflections along n directions) forming a scan swath, generally perpendicular to the axis of the carrier vehicle. The combination of several lidar recurrences hence makes it possible to determine the bathymetry of a sea bottom in a lane along the route of the carrier vehicle.

To perform a sea bottom topography based on the measurements coming from a system of the multi-beam sonar or lidar type, it is necessary to take into account the position and orientation of the vehicle carrying the measurement system, in order to position correctly the measurement points corresponding to the different beams, called sounding points, on a geographic map.

Hence, the systems for measuring the sea bottom topography generally combine a SONAR or LIDAR system with an inertial navigation system (INS), itself frequently coupled to a satellite geolocation and navigation receiver (GPS). The use of an inertial navigation system makes it possible to determine the position (x, y, z) and orientation (heading, roll, pitch) of the carrier vehicle and hence to take it into account in the geographical positioning of the sounding points.

The method consisting in associating a system for measuring the distance to the bottom with an inertial system is the method currently used by all the bathymetry system operators over the world.

This method has nevertheless two major drawbacks. On the one hand, the required inertial navigation systems, frequently including an accurate GPS receiver of the RTK type, are relatively expensive. On the other hand, although the inertial systems make it possible to accurately determine the attitude (roll, pitch), the position (x, y) in a horizontal plane (with relative errors of the order of a few centimetres over durations of a few tens of seconds) and, for the more elaborate ones, the heading of the carrier vehicle, these inertial systems have for defect to be relatively inaccurate in determining the altitude (z) of the carrier vehicle along a vertical axis (with relative errors reaching rapidly several tens of centimetres, or even a few metres, over durations of a few tens of seconds). The determination of the altitude (z) of the carrier vehicle hence depends very strongly on the availability of GPS information of very high quality, with an accuracy of the order of a few centimetres. Now, this accurate vertical position GPS information is generally not continuously available in space, and in particular it is not available off the coasts.

Of course, it is generally possible to determine the mean altitude of the carrier vehicle over a time period of a few minutes, typically by averaging the values provided by an inaccurate sensor. On the other hand, it is particularly difficult to determine very accurately the altitude error variations in the short term (a few seconds to a few tens of seconds). Yet, the short-term altitude error variations have a strong impact on the quality of the topography obtained.

The techniques currently available to solve this problem of determination of the short-term carrier vehicle altitude error variations are generally based on assumptions about either the movement of the carrier vehicle or the ground topography or the combination of both. Hence, many inertial systems, equipping the hydrographic boats, use swell filters. By construction of these swell filters, it is supposed that the frequencies of the movements in altitude are located in a range of relatively high frequencies, which makes it possible to eliminate the lowest frequencies by digital filtering and hence to reduce the intrinsic error of altitude of the inertial systems. Certain purely acoustic processing methods, such as the method described in the patent document US2013/0016584, also suppose that the frequencies of movements of the carrier vehicle are higher than the frequencies of variation of the sea bottom altitude along the route of the carrier vehicle.

Unfortunately, the assumptions of these methods are generally not perfectly satisfying, which causes imperfections in the determined topographic maps when applying them.

One of the objects of the invention is to propose a bathymetry system and method making it possible to correct the movements of the carrier vehicle, and in particular the vertical movements, without having to make assumptions about the sea bottom topography or about the carrier vehicle movements.

OBJECT OF THE INVENTION

In order to remedy the above-mentioned drawback of the state of the art, the present invention proposes a bathymetric system comprising a computer and a multi-beam emitting and receiving device attached to a carrier vehicle, the multi-beam emitting and receiving device being configured to emit, in a first recurrence, a first incident beam towards the sea bottom following a first emission surface and to detect, in the first recurrence, the amplitude of a first plurality of beams reflected in a first plurality of directions by reflection of the first incident beam off the sea bottom, the computer being configured to determine, based on the amplitude of the first plurality of reflected beams detected, the three-dimensional spatial coordinates of a first plurality of sounding points located at the intersection between the sea bottom and the first emission surface, said first plurality of sounding points forming a first scan swath in the first recurrence.

More particularly, it is proposed, according to the invention, a bathymetric system wherein the multi-beam emitting and receiving device is configured to emit, in a second recurrence, a second incident beam towards the sea bottom following a second emission surface, the second emission surface being not parallel to the first emission surface, and the first and second incident beams not interfering with each other, in other words, the first and second incident beams being decorrelated from each other in time and/or frequency and/or phase, so that the inter-correlation thereof at reception is zero, the multi-beam emitting and receiving device being configured to detect, in the second recurrence, the amplitude of a second plurality of beams reflected in a second plurality of directions by reflection of the second incident beam off the sea bottom, the computer being configured to determine, based on the amplitude of the second plurality of reflected beams detected, the three-dimensional spatial coordinates of a second plurality of sounding points located at the intersection between the sea bottom and the second emission surface, said second plurality of sounding points forming a second scan swath, the multi-beam emitting and receiving device being configured so that the first scan swath and the second scan swath include at least one redundant sounding point having two-dimensional spatial coordinates in a horizontal plane that are identical in the first recurrence and in the second recurrence, the computer being configured to calculate an error variation of the carrier vehicle altitude based on the altitude spatial coordinate variations of at least one redundant sounding point between the first recurrence and the second recurrence, and the computer being configured to correct the three-dimensional spatial coordinates of the first scan swath and/or the second scan swath, as a function of the calculated carrier vehicle altitude error variation between the first recurrence and the second recurrence.

The invention is hence implemented by combining, on the one hand, a hardware device configured to perform at each time instant the measurement of the sounding points, so that sounding points taken at two recurrence time instants temporally separated by several seconds spatially overlap each other in part and, on the other hand, an algorithm for combining measurements performed at different recurrence time instants in order to determine the carrier vehicle altitude variation between these recurrence time instants.

The invention exploits the partial spatial overlapping of different scan swaths performed in different recurrences to determine accurately the altitude error variations between these different recurrences.

The invention hence makes it possible to correct the altitude error variations between two recurrences not correlated to each other, without making assumptions about the carrier vehicle movements or about the sea bottom topography.

The system hence makes it possible to correct the altitude bathymetric measurements between two recurrences, whether these recurrences are consecutive or not, as soon as there exists at least one redundant sounding point belonging to two scan swaths associated to these two recurrences. This system makes it possible, on a recursive basis, to progressively improve the accuracy of the bathymetric measurements as recurrences go along.

The system is configured to sound the sea bottom following at least two incident surfaces not parallel to each other, and to collect the waves reflected in several directions for each sounded incident surface. This system for correcting the carrier vehicle altitude error variations may be easily adapted to existing bathymetric systems, having for example a two-dimensional multi-beam antenna, or two multi-beam antennas arranged transversely relative to each other.

Other non-limitative and advantageous characteristics of the bathymetric system according to the invention, taken individually or according to all the technically possible combinations, are the following:
- the multi-beam emitting and receiving device includes a multi-beam sonar having a first and a second multi-beam emitting and receiving linear antennas, the first linear antenna being arranged transversely with respect to the second linear antenna;
- on the one hand, the first antenna is configured to emit the first incident beam during the first recurrence, and the second antenna is configured to detect the first scan swath during the first recurrence; and, on the other hand, the second antenna is configured to emit the second incident beam during the second recurrence, and the first antenna is configured to detect the second scan swath during the second recurrence;
- the first antenna and the second antenna are arranged respectively at about 45 degrees from a lubber line of the carrier vehicle;
- the carrier vehicle includes a lubber line and the first antenna is aligned to this lubber line;
- the multi-beam emitting and receiving device includes a multi-beam sonar having at least one two-dimensional multi-sensor receiving antenna;
- the bathymetric system comprises two emitting antennas and one multi-sensor linear receiving antenna;
- the multi-beam emitting and receiving device includes a lidar system configured to emit a laser beam towards the sea bottom following a first, and respectively a second, emission surface, and to detect a plurality of laser beams reflected off the sea bottom, forming the first scan swath, and respectively the second scan swath;
- the lidar system includes a bidirectional beam scanning laser source or two unidirectional beam scanning laser sources.

According to a particular embodiment, the bathymetric system further includes at least one external sensor chosen among a satellite geolocation system (GPS), a depth sensor or an inertial navigation unit, this external sensor being configured to provide at least one complementary measurement of position and/or orientation of the multi-beam emitting and receiving device, and the computer is configured to calculate an error variation of the carrier vehicle altitude based on the altitude spatial coordinate variations of the at least one redundant sounding point between the first recurrence and the second recurrence and as a function of said at least one complementary measurement of position and/or orientation.

The invention also proposes a bathymetric method comprising the following steps:
a) emitting, in a first recurrence, by a multi-beam emitting and receiving device, a first incident beam capable of propagating in an underwater environment towards a sea bottom following a first emission surface,
b) detecting, by the multi-beam emitting and receiving device, in the first recurrence, the amplitude of a first plurality of beams reflected in a first plurality of directions, by reflection of the first incident beam off the sea bottom,
c) calculating, based on the amplitude of the first plurality of reflected beams detected, three-dimensional spatial coordinates of a first plurality of sounding points located at the intersection between the sea bottom and the first emission surface, said first plurality of sounding points forming a first scan swath in the first recurrence,
d) emitting, in a second recurrence, by the multi-beam emitting and receiving device, a second incident beam capable of propagating in the underwater environment towards the sea bottom following a second emission surface, the second emission surface being not parallel to the first emission surface, and the second incident beam and the first incident beam not interfering with each other, in other words, the first and second incident beams being decorrelated from each other in time and/or frequency and/or phase, so that the inter-correlation thereof at reception is zero,
e) detecting, by the multi-beam emitting and receiving device, in the second recurrence, the amplitude of a second plurality of beams reflected in a second plurality of directions by reflection of the second incident beam off the sea bottom,
f) calculating, based on the amplitude of the second plurality of reflected beams detected, the three-dimensional spatial coordinates of a second plurality of sounding points located at the intersection between the sea bottom and the second emission surface, said second plurality of sounding points forming a second scan swath in the second recurrence,
g) determining at least one redundant sounding point belonging to the first and second scan swaths, a redundant sounding point having two-dimensional spatial coordinates in a horizontal plane that are identical in the first and second recurrences,
h) calculating an error variation of the carrier vehicle altitude as a function of the altitude spatial coordinates of the at least one redundant sounding point calculated at step c) for the first recurrence and, respectively, at step f) for the second recurrence, and
i) correcting the three-dimensional spatial coordinates of said first, and respectively second, scan swaths, as a function of the carrier vehicle altitude error variation calculated at the previous step.

DETAILED DESCRIPTION OF AN EXEMPLARY EMBODIMENT

The following description with respect to the appended drawings, given by way of non-limitative examples, will allow to well understand in what consists the invention and how it can be implemented.

DEVICE

In FIGS. 1 to 4, a local orthonormal reference system (X, Y, Z), in which the XY plane is a horizontal plane and the Z axis is a vertical axis.

Figure 1:
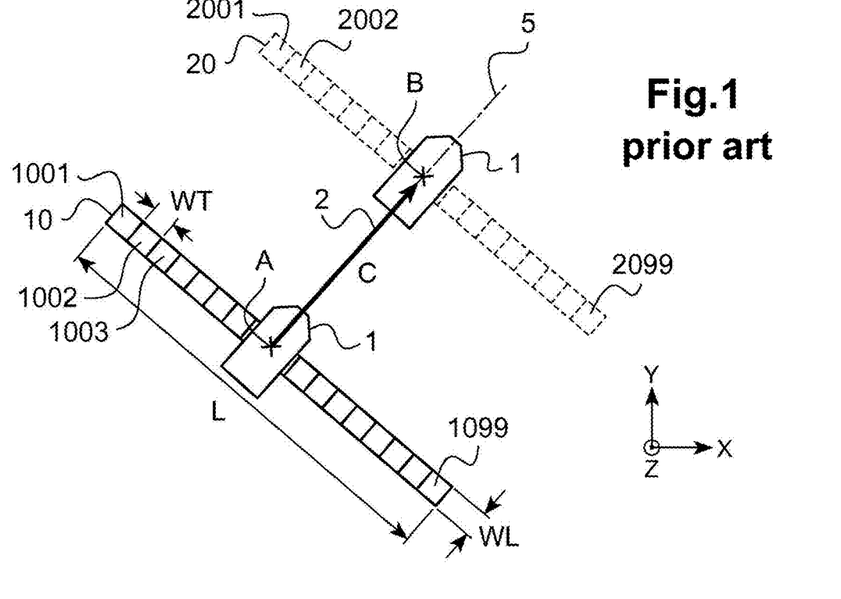
FIG. 1 shows a top view of a bathymetric system, of the multi-beam sonar or lidar type, of the prior art, forming, in two distinct recurrences, scan swaths that are perpendicular to the horizontal axis of displacement of the carrier vehicle.

In FIG. 1, the operation of a conventional bathymetric system of the multi-beam sonar or lidar type according to the prior art is shown in projection on a horizontal plane.

By way of example, the structure and operation of a bathymetric system of the multi-beam sonar type are described in detail. However, the same principles are similarly applied to a bathymetric system of the lidar type.

The bathymetric system comprises at least one acoustic emitter and one antenna of acoustic receivers, for example of the linear type, arranged transversally to the lubber line 5 of the boat 1. The acoustic emitter 1 and the acoustic receiver antenna are attached to a carrier vehicle, for example fixed under the hull of a boat 1 having a lubber line 5, i.e. a reference line pointing towards the bow of the boat and corresponding to the longitudinal axis of the boat.

During a first recurrence, the boat 1 is in a first position denoted A, the acoustic emitter emits an acoustic signal towards the sea bottom following a first emission surface and the antenna of acoustic receivers detects the amplitude of the acoustic signals reflected in directions corresponding to each acoustic receiver. The emission surface intersects the sea bottom following a geometrical figure, schematically shown by a line segment 10 in FIG. 1. By way of example, the line segment 10 has a length L and a width WL. The width WL generally corresponds to the longitudinal resolution along the lubber line 5 of the boat. The length L and the width WL are function of multiple parameters, including the aperture of the incident beam, the number of acoustic receivers and the depth of the sea bottom. During the first recurrence, the multi-beam acoustic receiver antenna makes it possible to measure the amplitude of a first plurality of acoustic beams reflected along n directions. The computer determines, based on the amplitude of the first plurality of reflected acoustic beams detected, the three-dimensional spatial coordinates of a set of sounding points on the line segment, with a transverse resolution WT. The three-dimensional spatial coordinates (x, y, z) of M sounding points 1001, 1002, 1003, . . . , 1009 on the line segment are hence obtained, where M is a natural integer equal to the length L divided by the transverse spatial resolution WT. M is generally chosen equal to 64, 128 or 256 according to the acoustic antenna. The M sounding points of the sea bottom form a first scan swath 10, in the first recurrence. A first scan swath 10 in the axis of the linear acoustic receiver antenna is hence collected.

The boat moves by a distance C along the axis of displacement 2 and is in a second position denoted B at a second recurrence time instant. During the second recurrence, a second scan swath 20, consisted of M sounding points 2001, 2002, ..., 2099, is similarly performed. The second scan swath 20 has generally the same longitudinal and, respectively transverse, spatial resolution as the first scan swath 11. In projection onto a horizontal plane, the second scan swath 20 is parallel to the first scan swath 10.

It is observed that, subjected to a significant progression of the boat, the distance C being higher than the longitudinal spatial resolution WL, the scan swaths 10 and 20 performed at two different recurrence time instants have no sounding point in common. The pieces of information about these two scan swaths 10, 20 being independent from each other, it is generally not possible to combine them to estimate a variation of the carrier vehicle altitude between these two recurrence time instants without making assumptions about the carrier vehicle movement frequencies with respect to the sea bottom altitude variation frequencies along the route of the carrier vehicle.

An aspect of the invention is based on the acquisition of measurements of the sounding points in such a manner that the scan swaths performed at different recurrence time instants spatially overlap each other in part, which makes it possible to determine accurately the carrier vehicle altitude error variations between these different recurrence time instants.

Figure 2:
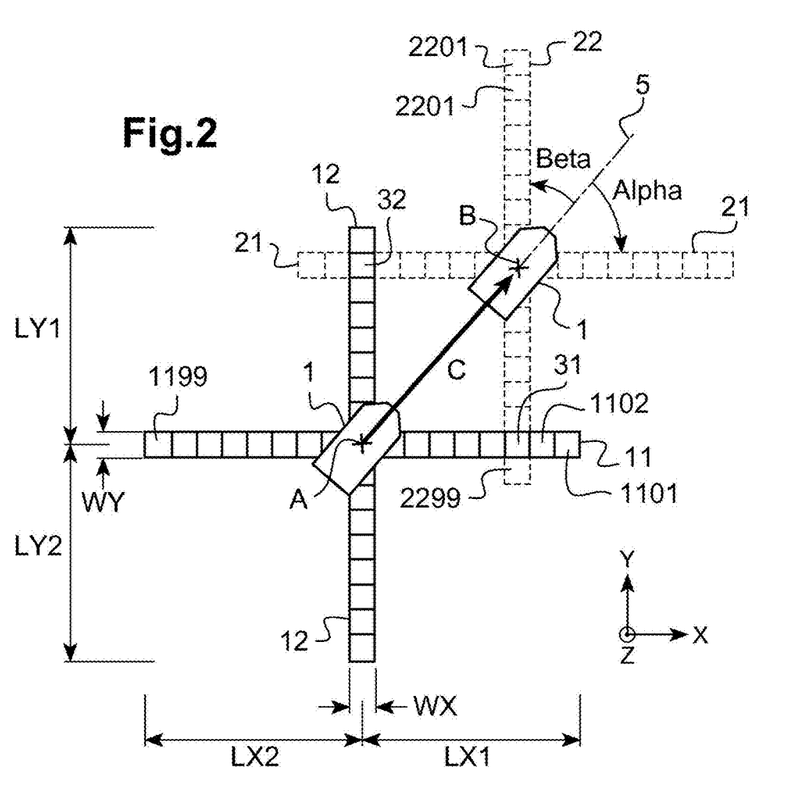
FIG. 2 shows a top view of a bathymetric system, of the multi-beam sonar or lidar type, according to an embodiment of the invention.

In FIG. 2, the operation of a bathymetric system according to a first embodiment is schematically shown in top view. The system herein includes a first linear antenna and a second linear antenna, oriented so as to form an angle ALPHA, respectively an angle BETA, with the lubber line 5 of the carrier vehicle 1. Preferably, the angles ALPHA and BETA are opposed to each other, so that the two linear antennas are arranged symmetrically with respect to the lubber line 5 of the carrier vehicle 1. For example, the first antenna is aligned to the X axis and the second antenna is aligned to the Y axis of the orthonormal reference system (X, Y, Z). Advantageously, the two linear antennas have the same length, the same number of acoustic receivers and provide the same longitudinal spatial resolution WL, respectively the same transverse spatial resolution WT.

At a first recurrence time instant, the carrier vehicle 1 being located at point A, a first scan swath 11 is collected along the X axis of the first antenna. By way of non-limitative example, this first scan swath is obtained by emitting an incident acoustic signal S1 on the second antenna and forming receiving paths on the first antenna, using the conventional path-forming methods and a filter adapted to the signal S. The path-forming method, conventional for all the multi-beam sonars, makes it possible to collect M sounding points along the scan swath determined by the emitting antenna, with generally M=64, 128 or 256, as a function of the specifications of the antenna. The first scan swath 11 hence includes M sounding points extending along X axis.

At a second recurrence time instant, the carrier vehicle 1 being located at point B, a second scan swath 22 is collected along the Y axis of the second antenna. Symmetrically, this second scan swath 22 is obtained by emitting another incident acoustic signal S2 on the first antenna and forming receiving paths on the second antenna. A second scan swath 22 also including M sounding points in the Y axis of the second antenna is hence obtained.

The displacement C of the boat 1 from point A to point B is such that the first scan swath intersects the second scan swath at a redundant sounding point 31. More precisely, the redundant sounding point 31 has the same X and Y coordinates in a horizontal plane (XY), to within the resolution of the acoustic beams. The beams having a certain width, each sounding point corresponds in fact to a small sounding area of size WL*WT. In order for two sounding points to be redundant, it is sufficient that the two corresponding areas intersect each other. However, the first scan swath is obtained at a first recurrence time instant and the second scan swath at a second recurrence time instant, which may be separated by several tens of seconds from the first recurrence time instant. On the other hand, the depth measurement of the redundant sounding point 31 belonging to the first scan swath 11 at the first recurrence time instant is different and independent of the depth measurement of the redundant sounding point 31 belonging to the second scan swath 22 at the second recurrence time instant, due to the altitude and altitude error variations of the carrier vehicle 1 between the first and the second recurrences.

The computer uses the depth difference measured along Z axis of this redundant sounding point 31 between the first and the second recurrence time instants to estimate the altitude variation of the carrier vehicle 1 between these two recurrence time instants. It is assumed that the first scan swath is at a reference position in Z. The computer compensates for this altitude variation for all the sounding point measurements of the second scan swath. A sea bottom topography having a better accuracy in altitude is hence obtained.

According to the configuration of the emissions-receptions of the multi-beam sonar, scan swaths can be formed so as to have one or several partial overlaps between scan swaths obtained at recurrence time instants temporally separated by several seconds.

Different variants are considered herein to determine scan swaths having one or several redundant sounding points at separate recurrence time instants.

According to variant, alternately, in the even recurrences, an acoustic signal is emitted on the second antenna and reflected acoustic signals are received by forming paths on the first antenna, and, in the odd recurrences, another acoustic signal is emitted on the first antenna and other reflected acoustic signals are received by forming paths on the second antenna.

According to another variant, in one recurrence over K recurrences, where K is a natural integer, an acoustic signal is emitted on the second antenna and reflected acoustic signals are received by forming paths on the first antenna, and in the K-1 following recurrences, another acoustic signal is emitted on the first antenna and reflected acoustic signals are received by forming paths on the second antenna. Preferably, in this case, the value of K is limited, for example K is comprised between 3 and 10, in order to keep the properties of redundancy between scan swaths that are non-consecutive in time.

According to still another variant, illustrated in FIG. 2, in the first recurrence, an acoustic signal S2 is emitted on the second antenna and acoustic signals reflected by reflection of the signal S2 off the sea bottom are received by forming paths on the first antenna, and simultaneously, in the first recurrence, another acoustic signal S1 is emitted on the first antenna and acoustic signals reflected by reflection of the signal S1 off the sea bottom are received by forming paths on the second antenna. The same process is implemented in each recurrence. The acoustic signals S1 and S2 are preferably chosen in such a manner that they have an inter-correlation close to zero, which makes it possible, in reception, to make the distinction between each other, because the adapted filter of one of the signals applied to the other gives an output value close to zero. For example, S1 and S2 occupy distinct acoustic frequency bands. In this case, in the first recurrence, a first scan swath 11 is acquired along X axis, and a second scan swath 12 along Y axis, then, in the second recurrence, a second scan swath 21 is acquired along X axis and a second scan swath 22 along Y axis. The first scan swath 12 along X axis has a redundant sounding point 31 with the second scan swath 22 along Y axis. Moreover, the first scan swath 12 along Y axis has another redundant sounding point 32 with the second scan swath 21 along X axis. Hence, two distinct redundant sounding points 31, 32 between these two recurrence time instants are obtained. On the other hand, the other sounding points of these two scan swaths are not redundant between each other.

Figure 3:
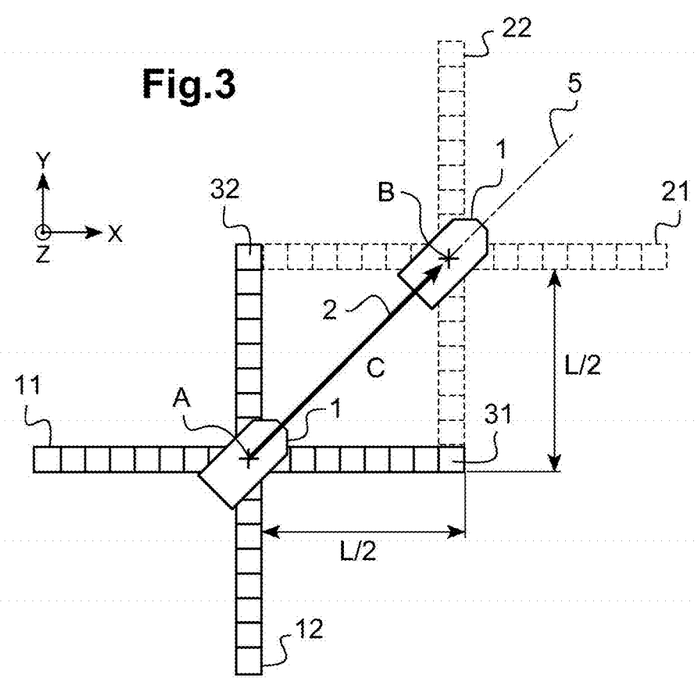
FIG. 3 shows another top view of a bathymetric system, of the multi-beam sonar or lidar type, according to an embodiment of the invention.

In an exemplary embodiment of a bathymetric system illustrated in FIG. 3, the antennas are oriented at 45 degrees from the lubber line of the boat 1, the emission and reception of the acoustic signals are simultaneous on both antennas, the aperture of the acoustic beams is of ±60 degrees, and the distance of the sea bottom is of about 150 metres.

The coverage area of the acoustic beams emitted at a given time instant on the sea bottom is composed of two orthogonal segments each having a length L of 260 metres and crossing each other at the upright of the boat. By calculating the distances, as illustrated in FIG. 3, it is observed that the scan swaths 21, 22 obtained at a second recurrence time instant continue to intersect each other at the sounding points 31, 32 located at the ends of the emitted scan paths 11, 12 obtained at the first recurrence time instant, when the displacement C of the boat remains lower than or equal to $180\ m=\sqrt{2\cdot 260^2}$ between these two recurrence time instants. With a boat speed of displacement of the order of 4 knots, it is deduced therefrom that the scan swaths 21, 22 intersect with the scan swaths 11, 12 during 90 s. This duration is widely sufficient to solve the problem of estimation of the short-term carrier vehicle altitude error variations.

It is observed that these overlapping properties are also valid in the two other schemes of emission consisting in alternating the use of the antennas as a function of the recurrences, with alternation of even and odd recurrences or with alternation of one recurrence over K. The choice of the scheme of emission is then determined as a function of other specifications of the bathymetric system operation.

The configuration in which the antennas form an angle of 45 degrees with the lubber line of the boat is the most interesting in terms of redundancy of the sounding points, which is useful in particular to estimate the other parameters of the movement. Nevertheless, other configurations may be used. For example, a conventional configuration may be used, in which one of the antennas is aligned with the longitudinal axis of the boat and the other antenna is arrange transversely to this axis.

The duration of the spatial overlapping obtained by crossing the scan swaths is hence far higher than the duration of overlapping of two parallel scan swaths (as illustrated in FIG. 1), which is limited by the width WL of a scan swath.

According to a variant, it may be useful to phase-shift the acoustic emission signals of the different transducers of each antenna in order to depoint the signal emitted with respect to the plane orthogonal to the antenna. In this case, the scan swaths of the sonar are no longer line segments but hyperbola segments, however the properties of partial redundancy of the sounding points is generally held.

The frequency of the acoustic signals used is generally comprised between 5 kHz and 1 MHz. The acoustic frequency may be adapted as a function of the desired range and resolution. The acoustic frequency mainly determines the range and resolution of the system. The invention applies indifferently to any acoustic frequency reflected off the sea bottom and detected by the multi-beam antenna.

Figure 4:
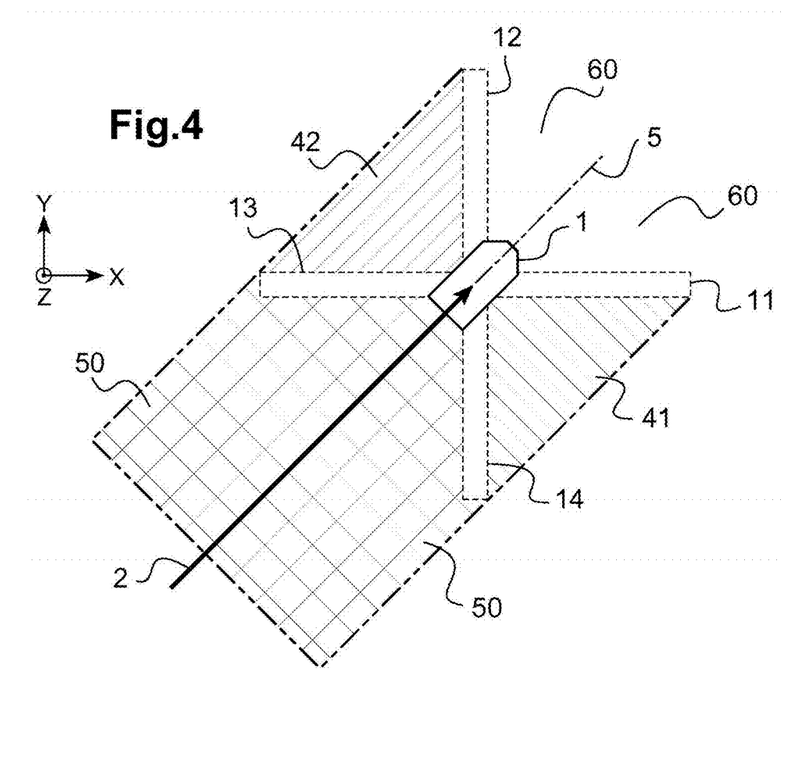
FIG. 4 illustrates schematically, in top view, the areas measured by the bathymetric system, of the multi-beam sonar or lidar type, according to an embodiment of the invention.

The invention is not limited in any way to the two-antenna configuration as described in relation with FIGS. 2-4. Many other acoustic antenna configurations also make it possible to ensure the property of redundancy of the sounding points between temporally separated recurrence time instants.

For example, a two-dimensional multi-sensor antenna also makes it possible to collect the positions of redundant sounding points at distinct recurrence time instants. A two-dimensional antenna is however more expensive than two linear antennas.

In another exemplary embodiment, the system includes a single multi-sensor linear receiving antenna and two monolithic emitting antennas, an emitting antenna emitting under the boat and the other emitting antenna located towards the front of the boat. However, this configuration is less advantageous in terms of redundancy.

As indicated hereinabove, the invention is not limited to the emission and the reception of acoustic signals. The invention similarly applies to the emission and the reception of optical signals. For example, the same properties of sounding point redundancy would be obtained by combining two beam-scanning LIDARs, each LIDAR comprising a laser source, and a system for scanning a beam along one axis, so as to scan each laser beam in a plane, the two planes being arranged orthogonally relative to each other. The beams emitted by the two laser sources do not optically interfere between each other, due to their geometry. Alternately, a bathymetric system based on a LIDAR comprising a single laser source and a device for scanning a beam along two transverse axes is also considered. Such a LIDAR system makes it possible to collect redundant sounding points at distinct recurrence time instants and to calculate the carrier vehicle altitude error variations between these recurrence time instants.

Method

In the following, an exemplary method for processing the signals between distinct recurrences to extract therefrom at least one redundant point, and to correct the bathymetric measurements of the movements of the carrier vehicle, will be described in detail.

Let's suppose that, previously to the recurrence N, a partial bathymetric map of the sea bottom is available, made from the recurrences 1 to N−1 of a bathymetric system, based on a multi-beam sonar or on a lidar, as described hereinabove, for example in relation with FIGS. 2 and 3.

In the recurrence N, new sounding points are obtained. As a first approximation, the coordinates of these sounding points are correct, to within an offset, denoted DZN, along the vertical axis. Given the general configuration of the bathymetric system described hereinabove, a certain number M≥1 of the sounding points obtained in the recurrence N belong to the already-mapped area and hence form M redundant sounding points. We hence have M linear equations about DZN, i.e. one equation per sounding point redundant with a sounding point of the already-mapped area. It is hence sufficient to find the value of DZN that approaches the best the solution of these M equations. For example, it is assumed that DZN is equal to the mean of the M' values given by the sub-set of the M equations obtained by removing the potential aberrant points.

It is observed that, if M is equal to 1, no aberrant point can be removed. On the other hand, the higher M is, the higher number of aberrant points can be removed using a suitable statistic method, for example a likelihood method. In practice, the number M is generally very significantly higher than 1. Generally, in a multi-beam sonar, a scan swath segment corresponds to many acoustic beams, going from a few tens to a few hundreds of acoustic beams as indicated hereinabove, and hence to many sounding points. If the antenna configuration is suitably chosen, the number of redundant sounding points is very high. In FIG. 4, a sonar including two emitting-receiving antennas arranged symmetrically at 45 degrees from the lubber line 5 of the boat 1, as described in relation with FIGS. 2-3, at a recurrence time instant N. The sonar is for example configured to obtain in each recurrence a scan swath extending along the X axis and another scan swath extending along the Y axis. More precisely, the scan swath along X axis includes one scan swath segment half 13 and another scan swath segment half 11. Similarly, the scan swath along Y axis includes, on either side of a vertical plane passing through the lubber line of the boat, one scan swath segment half 12 and another scan swath segment half 14. The boat moves along the displacement axis 2. In the recurrence N, the area 60 of the sea bottom located at the front of the boat has not yet been sounded. The zones 41; 42 and 50 located along the trace of displacement of the boat have already been sounded during the recurrences 1 to N−1. More precisely, the area 41 has been mapped by the antenna extending along X axis, the area 42 has been mapped by the antenna extending along Y axis, and the area 50, located at the rear of the boat, has already been mapped by these two antennas in different recurrences. Hence, in the recurrence N, the scan swath segment half 13 along X axis forms sounding points potentially redundant with sounding points obtained in a previous recurrence on one half of the antenna extending along Y axis. Similarly, in the recurrence N, the scan swath segment half 14 along Y axis forms sounding points potentially redundant with sounding points obtained in a previous recurrence on one half of the antenna extending along X axis. In the recurrence N, the redundant points may form up to half the total number of sounding points obtained, which provides a number of redundant sounding points of the order of 30 to 250, in the recurrence N.

Once the value of DZN estimated, the bathymetric map of the sea bottom is completed using the sounding points obtained in the recurrence N, corrected with the altitude error DZN.

It is observed that, once obtained a partial map of the sea bottom, it is easy to complete it by eliminating the effects of the carrier vehicle altitude error variations from the measurement system.

The adjustment problem hence comes down to obtaining an initial map before implementing the method described hereinabove. There exist for that purpose many more or less complex possibilities according to the desired quality for the initial estimation of the altitude. The simplest possibility consists in taking as an initial map the very partial but sufficient map obtained after the first sounding, based on the altitude data available in the first recurrence. More generally, it may be taken as an initial map the map obtained based on the first K recurrences, using approached estimations of the carrier altitude. In the case where the carrier vehicle is a boat, the approached altitude thereof is known, because the boat is by definition on the surface of the sea.

According to a variant, the bathymetric system further includes an external altitude sensor.

The method for correcting the altitude movements of the carrier vehicle described hereinabove is advantageously combined with the use of an external altitude sensor connected to the bathymetric system. For example, for a boat, a GPS system provides the altitude of the boat. By way of another example, for a submarine system, a pressure sensor provides a measurement of the depth of immersion of the multi-beam emitting-receiving system. This combination of a multi-beam bathymetric system and an external sensor makes it possible to progressively improve the quality of the bathymetric map by taking advantage of the good mean accuracy of the external sensor in the long term.

To efficiently combine the measurements coming from the multi-beam bathymetric system and from the external sensor, the step of estimating the value of the offset DZN is adapted as follows.

In each recurrence, DZN is assumed equal to the barycentre of the mean of the M' redundant sounding points with the map and of the value ZN provided by the external sensor, the barycentric coefficients being determined based on the uncertainties, on the one hand, of the external altitude sensor, and on the other hand, of the sounding points of the map.

By way of example, it is assumed:

$$DZN = 1/(SIGMA2\_MAP/M' + SIGMA2\_ZN) * ((SIGMA2\_MAP/M')*ZN + (SIGMA2\_ZN)*MEAN)$$

where SIGMA2_ZN is the measurement error variance of the external altitude sensor, SIGMA2_MAP is the altitude error variance of the points of the map and MEAN is the mean of the M' altitude error values given by the sub-set of the M redundant sounding point equations obtained by removing the aberrant points.

According to a variant of the method, an estimation of the other parameters of the movement in translation and/or in rotation of the carrier vehicle is deduced from the measurements of redundant sounding points in distinct recurrences.

In this case, the same approach may be used, with a slight modification of the algorithm for estimating the variations of the other parameters of the movement between different time instants of measurement of the sounding points. In particular, the same approach may be used to estimate the variations of orientation (heading, roll, pitch) of the multi-beam bathymetric system. Indeed, each variation of one of these parameters between two recurrences translates into a defined error formula at the estimated geographical position of the sounding points as a function of their relative position with respect to the multi-beam bathymetric measurement system. Now, the relative position of the bathymetric measurement system is accurately known by the principle of measurement of the multi-beam sonar.

For example, a roll error of R radians causes for a point at a distance D with respect to the main axis of the measurement system, an altitude error in Z of the sounding point equal to R*D.

By taking advantage of the multiple redundancies between the sounding points calculated in the recurrence N, before the correction step, and of the map determined based on the previous recurrences, it is not only possible to determine the value of DZN but also that of R.

This estimation is made for example by a method of the least-squares type in which it is searched to minimize the distances between the new redundant sounding points and the pre-established map (the least-squares methods are well known by the one skilled in the art; moreover, the algorithms given hereinabove also pertain to the least squares method but in simpler cases).

A similar correction method can be applied to the heading and/or pitch variations.

It is observed that the quality of these estimations strongly depends on the spatial overlapping that is obtained between scan swaths obtained at different recurrence time instants. In practice, the configuration with the two antennas at 45 degrees from the longitudinal axis of the boat gives the best conditions of observability of the errors and hence the best estimations.

Here again, similarly to what is indicated hereinabove as regards an external altitude sensor, the correction method may be combined optimally with the use of an external sensor, for example of the inertial navigation system type, providing estimations of heading, roll, pitch and displacement variations.

The invention claimed is:

1. A bathymetric system, comprising:
a computer; and
a multi-beam emitting and receiving device attached to a carrier vehicle (1),
the multi-beam emitting and receiving device being configured to emit, in a first recurrence, a first incident beam towards a sea bottom and to measure an amplitude of a first plurality of beams reflected by reflection of the first incident beam off the sea bottom, the computer being configured to determine, based on the amplitude of the first plurality of reflected beams detected, three-dimensional spatial coordinates of a first plurality of sounding points (1101, 1102, . . . , 1199) located at an intersection between the sea bottom and the first incident beam, said first plurality of sounding points (1101, 1102, . . . , 1199) forming a first scan swath (11) in the first recurrence,
wherein:
the multi-beam emitting and receiving device is further configured to emit, in a second recurrence, a second incident beam towards the sea bottom, the second incident beam being not parallel to the first incident beam, and the first and second incident beams not interfering with each other,
the multi-beam emitting and receiving device being yet further configured to measure, in the second recurrence, an amplitude of a second plurality of beams reflected by reflection of the second incident beam off the sea bottom,
the computer being further configured to determine, based on the amplitude of the second plurality of reflected beams detected, three-dimensional spatial coordinates of a second plurality of sounding points (2201, 2202, . . . , 2299) located at an intersection between the sea bottom and the second incident beam, said second plurality of sounding points forming a second scan swath (22), so that at least one sounding point of the first scan swath (11) is redundant with a sounding point of the second scan swath (22), a redundant sounding point (31) having two-dimensional spatial coordinates in a horizontal plane that are identical in the first and second recurrences,
the computer being yet further configured to calculate an error variation of the carrier vehicle altitude based on altitude spatial coordinate variations of the at least one redundant sounding point (31) between the first recurrence and the second recurrence, and
the computer being yet still further configured to correct the three-dimensional spatial coordinates of said first, and respectively said second, scan swaths (11, 22), as a function of the calculated altitude error variation of the carrier vehicle (1) between said first and second recurrences.

2. The bathymetric system according to claim 1, wherein the multi-beam emitting and receiving device includes a multi-beam sonar having a first and a second multi-beam emitting and receiving linear antennas, the first linear antenna being arranged transversally with respect to the second linear antenna.

3. The bathymetric system according to claim 2,
wherein the first antenna is configured to emit the first incident beam, the second antenna is configured to detect the first scan swath in the first recurrence, and
wherein the second antenna is configured to emit the second incident beam, and the first antenna is configured to detect the second scan swath in the second recurrence.

4. The bathymetric system according to claim 2, wherein the first linear antenna and the second linear antenna are arranged symmetrically at about 45 degrees from a lubber line (5) of the carrier vehicle (1).

5. The bathymetric system according to claim 3, wherein the first linear antenna and the second linear antenna are arranged symmetrically at about 45 degrees from a lubber line (5) of the carrier vehicle (1).

6. The bathymetric system according to claim 2, wherein the first linear antenna is aligned to a lubber line of the carrier vehicle.

7. The bathymetric system according to claim 3, wherein the first linear antenna is aligned to a lubber line of the carrier vehicle.

8. The bathymetric system according to claim 1, wherein the multi-beam emitting and receiving device includes a multi-beam sonar having at least one two-dimensional multi-sensor receiving antenna.

9. The bathymetric system according to claim 8, further comprising:
two emitting antennas and one multi-sensor linear receiving antenna.

10. The bathymetric system according to claim 1, wherein the multi-beam emitting and receiving device includes a LIDAR system configured to emit a laser beam towards the sea bottom following a first, and respectively a second, incident beam, and to detect a plurality of laser beams reflected off the sea bottom, forming the first scan swath (11), and respectively the second scan swath (22).

11. The bathymetric system according to claim 10, wherein the LIDAR system includes a bidirectional beam scanning laser source or two unidirectional beam scanning laser sources.

12. The bathymetric system according to claim 1, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

13. The bathymetric system according to claim 2, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

14. The bathymetric system according to claim 3, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

15. The bathymetric system according to claim 4, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

16. The bathymetric system according to claim 6, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

17. The bathymetric system according to claim 8, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

18. The bathymetric system according to claim 9, further comprising:
at least one external sensor chosen among a satellite geolocation system, a depth sensor or an inertial navigation unit,
said at least one external sensor is configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

19. The bathymetric system according to claim 10, further comprising:
at least one external sensor chosen among a satellite geolocation system, a depth sensor or an inertial navigation unit,
said at least one external sensor configured to provide at least one complementary measurement of position and/or orientation of the multi-beam emitting and receiving device, and
wherein the computer is configured to calculate an error variation of the carrier vehicle altitude based on the altitude spatial coordinate variations of the at least one redundant sounding point (31) between the first recurrence and the second recurrence and as a function of said at least one complementary measurement of position and/or orientation.

20. A bathymetric method, comprising the following steps:
a) emitting, in a first recurrence, by a multi-beam emitting and receiving device, a first incident beam capable of propagating in an underwater environment towards a sea bottom;
b) detecting, by the multi-beam emitting and receiving device, in the first recurrence, an amplitude of a first plurality of beams reflected in a first plurality of directions, by reflection of the first incident beam off the sea bottom;
c) calculating, based on the amplitude of the first plurality of reflected beams detected, three-dimensional spatial coordinates of a first plurality of sounding points located at an intersection between the sea bottom and the first incident beam, said first plurality of sounding points forming a first scan swath in the first recurrence;
d) emitting, in a second recurrence, by the multi-beam emitting and receiving device, a second incident beam capable of propagating in the underwater environment towards the sea bottom, the second incident beam being not parallel to the first incident beam, and the second incident beam and the first incident beam not interfering with each other;

e) detecting, by the multi-beam emitting and receiving device, in the second recurrence, an amplitude of a second plurality of beams reflected in a second plurality of directions by reflection of the second incident beam off the sea bottom;

f) calculating, based on the amplitude of the second plurality of reflected beams detected, three-dimensional spatial coordinates of a second plurality of sounding points located at an intersection between the sea bottom and the second incident beam, said second plurality of sounding points forming a second scan swath in the second recurrence;

g) determining at least one redundant sounding point belonging to the first and second scan swaths, a redundant sounding point having two-dimensional spatial coordinates in a horizontal plane that are identical in the first and second recurrences;

h) calculating an error variation of the carrier vehicle altitude as a function of altitude spatial coordinates of the at least one redundant sounding point in the first and second recurrences; and i) correcting the three-dimensional spatial coordinates of said first, and respectively second, scan swaths, as a function of the error variation of the carrier vehicle altitude calculated in step h).

* * * * *